US012664542B2

(12) United States Patent
Edwards et al.

(10) Patent No.: US 12,664,542 B2
(45) Date of Patent: Jun. 23, 2026

(54) MANAGEMENT OF CREDENTIALS AND AUTHORIZATIONS FOR TRANSACTIONS

(71) Applicant: Capital One Services, LLC, McLean, VA (US)

(72) Inventors: Joshua Edwards, Philadelphia, PA (US); Abdelkadar M'Hamed Benkreira, Washington, DC (US); Adam Vukich, Springfield, VA (US); Jonatan Yucra Rodriguez, Allentown, PA (US); David Gabriele, Chicago, IL (US); Vu Nguyen, Pittsburg, CA (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 564 days.

(21) Appl. No.: 18/048,257

(22) Filed: Oct. 20, 2022

(65) Prior Publication Data

US 2023/0065032 A1 Mar. 2, 2023

Related U.S. Application Data

(63) Continuation of application No. 16/536,064, filed on Aug. 8, 2019, now Pat. No. 11,488,149.

(51) Int. Cl.

| | |
|---|---|
| *G06Q 10/10* | (2023.01) |
| *G06Q 20/38* | (2012.01) |
| *H04L 9/40* | (2022.01) |
| *G06Q 20/10* | (2012.01) |

(52) U.S. Cl.
CPC ............. *G06Q 20/38* (2013.01); *G06Q 10/10* (2013.01); *H04L 63/083* (2013.01); *G06Q 20/102* (2013.01)

(58) Field of Classification Search
CPC ....... G06Q 10/10; G06Q 20/38; G06Q 20/102
See application file for complete search history.

(56) References Cited

U.S. PATENT DOCUMENTS

| | | | |
|---|---|---|---|
| 7,107,244 B2 | 9/2006 | Kight et al. |
| 8,464,938 B2 | 6/2013 | Briscoe et al. |
| 8,695,077 B1 | 4/2014 | Gerhard et al. |

(Continued)

*Primary Examiner* — Hao Fu
(74) *Attorney, Agent, or Firm* — Harrity & Harrity, LLP

(57) ABSTRACT

A device may determine that transaction account information, associated with a transaction account associated with a user, is to be updated. The device may identify a merchant account that is configured to use the transaction account for a transaction associated with the user and a merchant, and navigate, using a navigation model, a merchant portal associated with the merchant, to access the merchant account. The device may perform, using the navigation model and login credentials for the merchant account, a login operation to access the merchant account via the merchant portal, wherein the login credentials are stored in a credential mapping that indicates an authorization to update the transaction account information to permit the transaction account information to be used in association with the merchant account. The device may update, using the navigation model, a transaction setting of the merchant account to include updated transaction account information for the transaction account.

20 Claims, 10 Drawing Sheets

400 ⟶

410 ～ Receive login credentials associated with a merchant account for a merchant, wherein the merchant account and the login credentials may be associated with a user 420 ～ Store, in a credential mapping, the login credentials to map the login credentials to the merchant account 430 ～ Detect an update event associated with a transaction setting of the merchant account, wherein the update event may correspond to updating the transaction setting with transaction account information associated with a transaction account of the user 440 ～ Navigate, based on detecting the update event, a browser to a merchant login interface of a merchant portal associated with the merchant, wherein the browser may be navigated using a navigation model 450 ～ Enter, using the navigation model, the login credentials into login fields of the merchant login interface to access a merchant account interface of the merchant, wherein the login credentials may be entered into the login fields based on the login credentials being stored in the credential mapping 460 ～ Navigate, using the navigation model, the merchant portal to access the transaction setting of the merchant account 470 ～ Update, using the navigation model, the transaction setting to include the transaction account information to permit the user to engage in a transaction using the transaction account

(56) References Cited

U.S. PATENT DOCUMENTS

| | | | |
|---|---|---|---|
| 8,706,577 B2 | 4/2014 | Stringfellow et al. | |
| 8,751,380 B2 | 6/2014 | Harvey et al. | |
| 10,475,018 B1 * | 11/2019 | Hitchcock | G06Q 20/227 |
| 10,936,643 B1 | 3/2021 | Alspaugh et al. | |
| 2002/0178370 A1 | 11/2002 | Gurevich et al. | |
| 2014/0019352 A1 | 1/2014 | Shrivastava | |
| 2014/0201076 A1 | 7/2014 | Pacher et al. | |
| 2015/0244714 A1 | 8/2015 | Kundu et al. | |
| 2015/0339661 A1 | 11/2015 | Li et al. | |
| 2016/0132858 A1 | 5/2016 | Chin et al. | |
| 2016/0294837 A1 | 10/2016 | Turgeman | |
| 2019/0122200 A1 | 4/2019 | Kurian | |
| 2019/0130094 A1 | 5/2019 | Votaw et al. | |
| 2019/0141596 A1 * | 5/2019 | Gay | H04W 36/026 |
| 2019/0180746 A1 * | 6/2019 | Diwan | G10L 15/22 |
| 2020/0004798 A1 * | 1/2020 | Weinert, Jr. | G06F 16/9577 |
| 2021/0042738 A1 | 2/2021 | Edwards et al. | |

* cited by examiner

400 ⟶

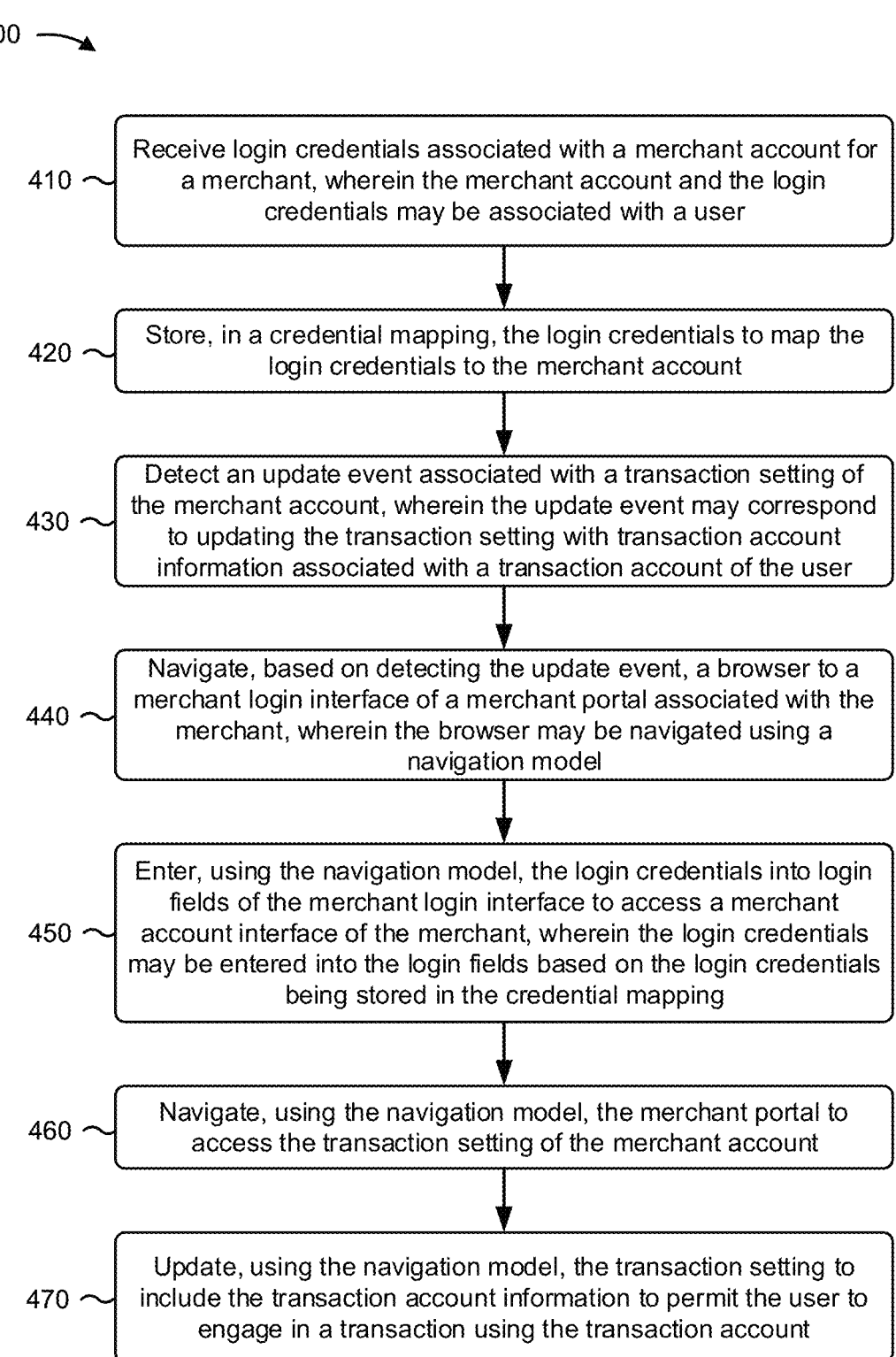

410 ∽   Receive login credentials associated with a merchant account for a merchant, wherein the merchant account and the login credentials may be associated with a user 420 ∽   Store, in a credential mapping, the login credentials to map the login credentials to the merchant account 430 ∽   Detect an update event associated with a transaction setting of the merchant account, wherein the update event may correspond to updating the transaction setting with transaction account information associated with a transaction account of the user 440 ∽   Navigate, based on detecting the update event, a browser to a merchant login interface of a merchant portal associated with the merchant, wherein the browser may be navigated using a navigation model 450 ∽   Enter, using the navigation model, the login credentials into login fields of the merchant login interface to access a merchant account interface of the merchant, wherein the login credentials may be entered into the login fields based on the login credentials being stored in the credential mapping 460 ∽   Navigate, using the navigation model, the merchant portal to access the transaction setting of the merchant account 470 ∽   Update, using the navigation model, the transaction setting to include the transaction account information to permit the user to engage in a transaction using the transaction account

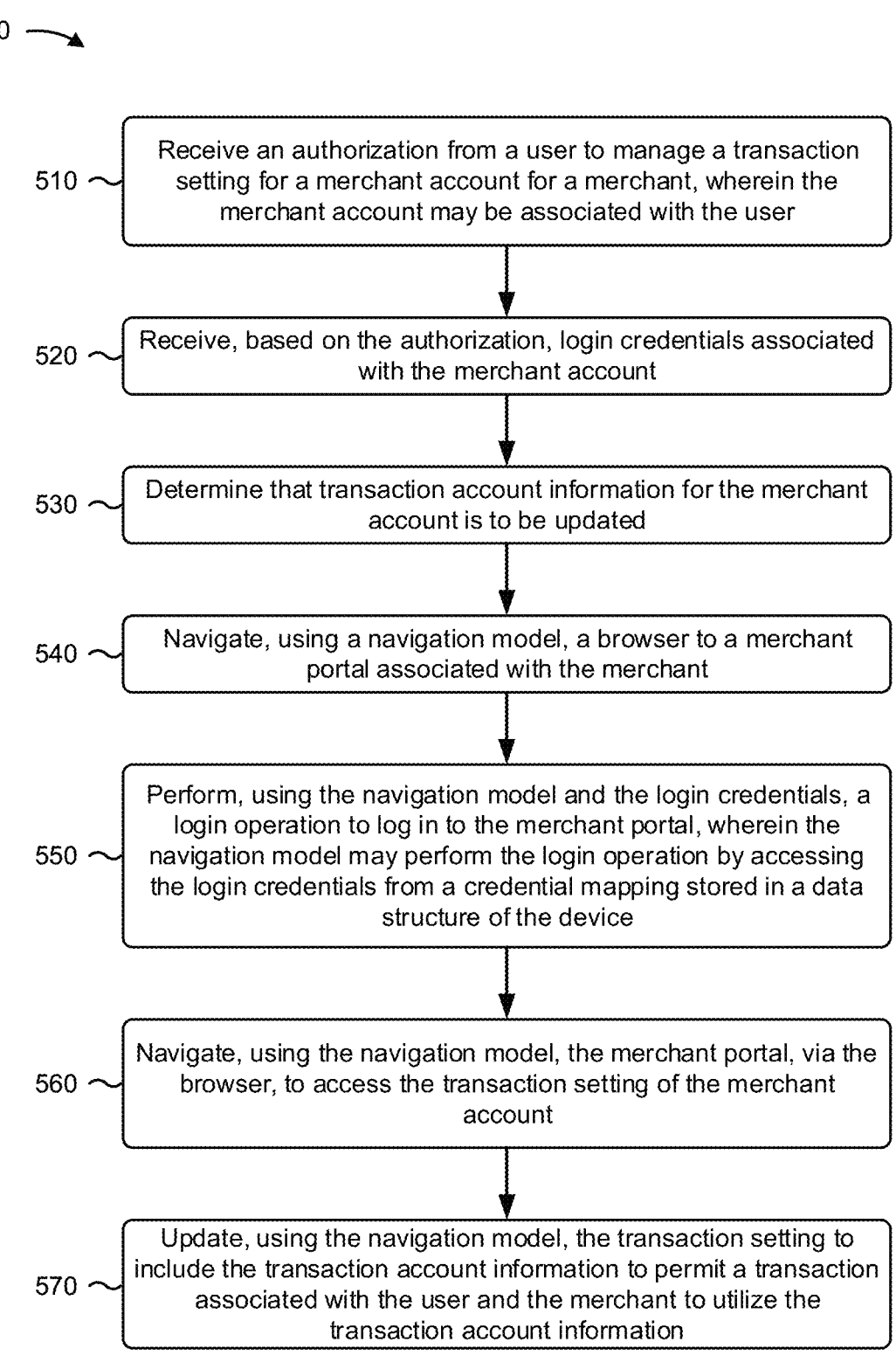

510 — Receive an authorization from a user to manage a transaction setting for a merchant account for a merchant, wherein the merchant account may be associated with the user 520 — Receive, based on the authorization, login credentials associated with the merchant account 530 — Determine that transaction account information for the merchant account is to be updated 540 — Navigate, using a navigation model, a browser to a merchant portal associated with the merchant 550 — Perform, using the navigation model and the login credentials, a login operation to log in to the merchant portal, wherein the navigation model may perform the login operation by accessing the login credentials from a credential mapping stored in a data structure of the device 560 — Navigate, using the navigation model, the merchant portal, via the browser, to access the transaction setting of the merchant account 570 — Update, using the navigation model, the transaction setting to include the transaction account information to permit a transaction associated with the user and the merchant to utilize the transaction account information

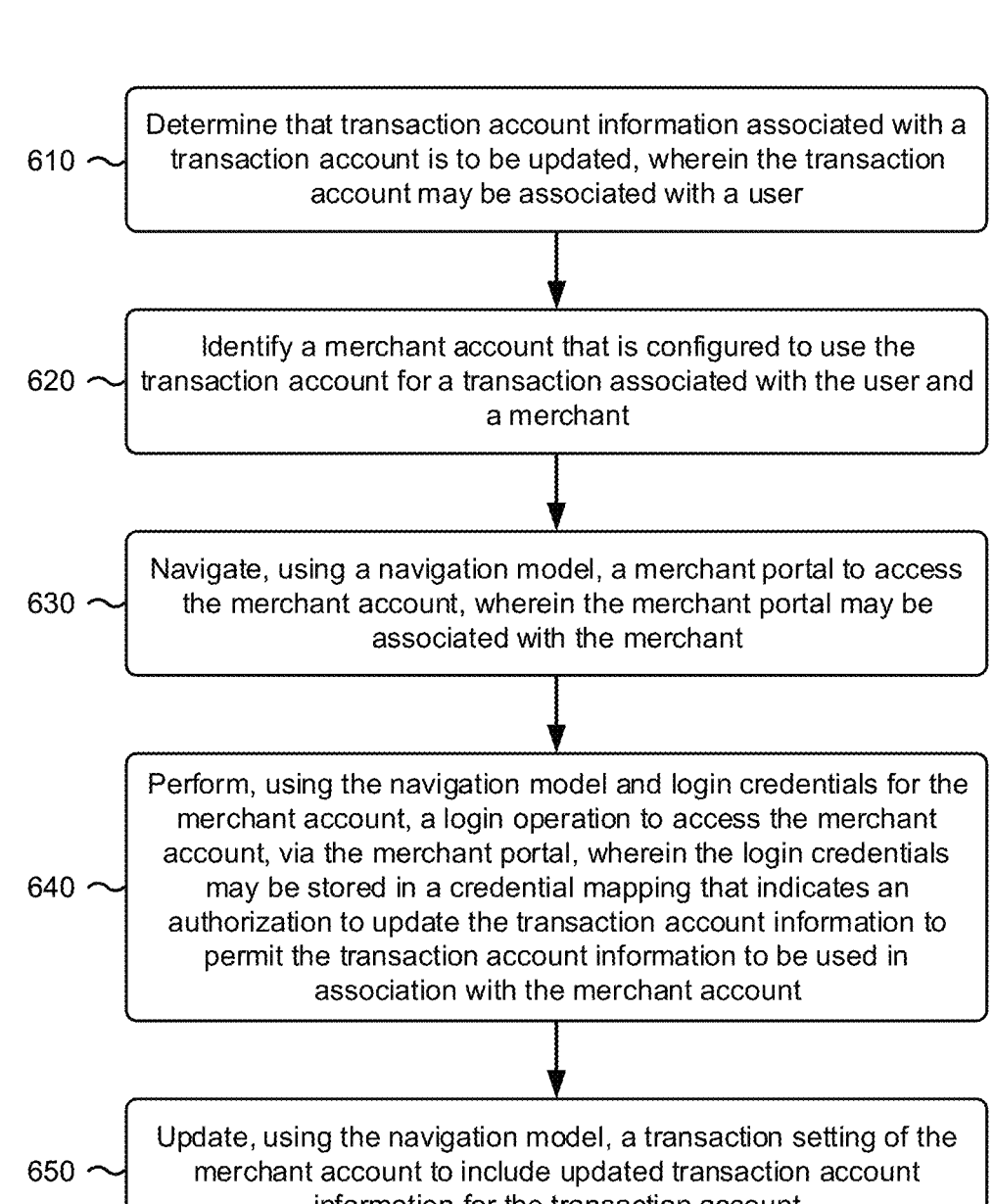

610 ⁓ Determine that transaction account information associated with a transaction account is to be updated, wherein the transaction account may be associated with a user 620 ⁓ Identify a merchant account that is configured to use the transaction account for a transaction associated with the user and a merchant 630 ⁓ Navigate, using a navigation model, a merchant portal to access the merchant account, wherein the merchant portal may be associated with the merchant 640 ⁓ Perform, using the navigation model and login credentials for the merchant account, a login operation to access the merchant account, via the merchant portal, wherein the login credentials may be stored in a credential mapping that indicates an authorization to update the transaction account information to permit the transaction account information to be used in association with the merchant account 650 ⁓ Update, using the navigation model, a transaction setting of the merchant account to include updated transaction account information for the transaction account

FIG. 6

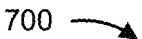

700

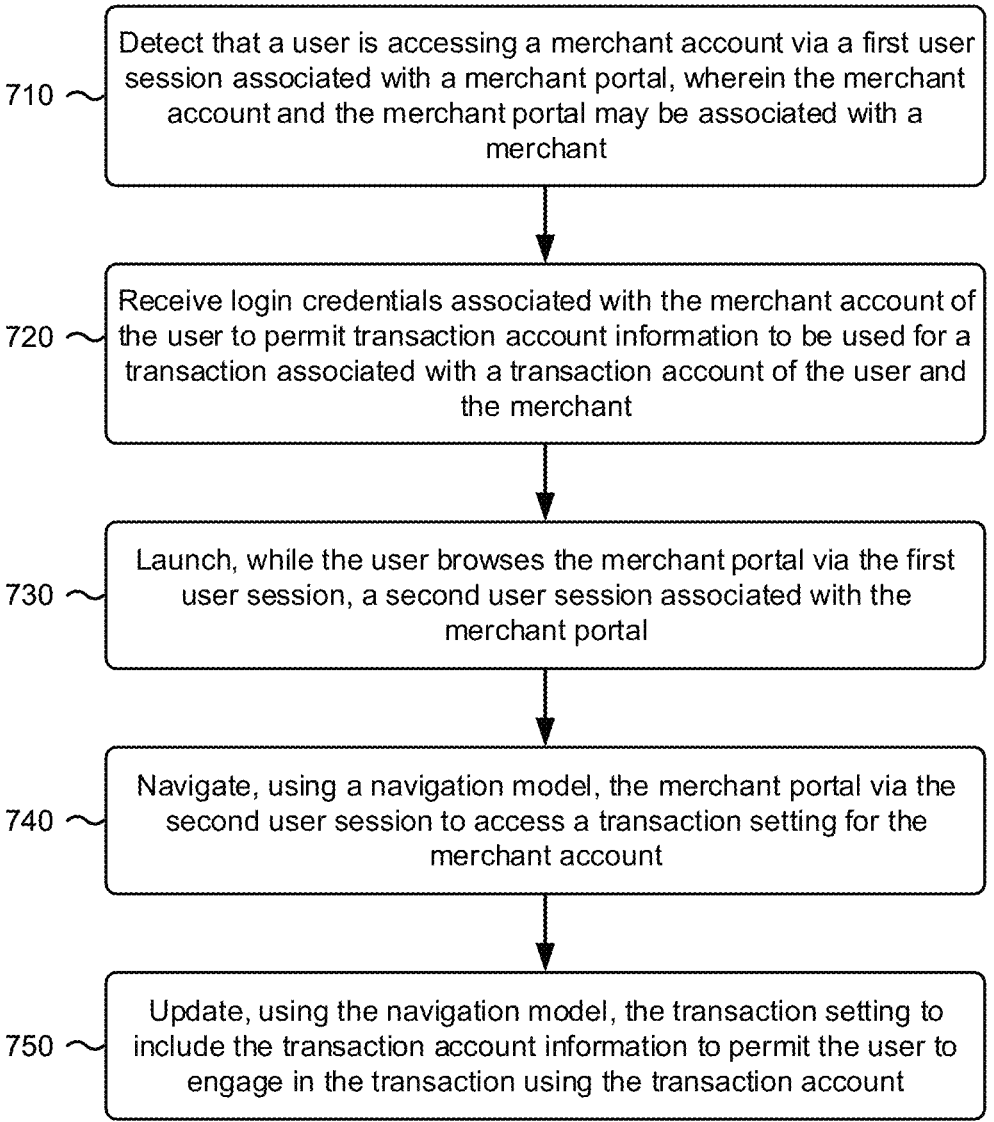

710 ~ Detect that a user is accessing a merchant account via a first user session associated with a merchant portal, wherein the merchant account and the merchant portal may be associated with a merchant 720 ~ Receive login credentials associated with the merchant account of the user to permit transaction account information to be used for a transaction associated with a transaction account of the user and the merchant 730 ~ Launch, while the user browses the merchant portal via the first user session, a second user session associated with the merchant portal 740 ~ Navigate, using a navigation model, the merchant portal via the second user session to access a transaction setting for the merchant account 750 ~ Update, using the navigation model, the transaction setting to include the transaction account information to permit the user to engage in the transaction using the transaction account

FIG. 7

MANAGEMENT OF CREDENTIALS AND AUTHORIZATIONS FOR TRANSACTIONS

RELATED APPLICATION

This application is a continuation of U.S. patent application Ser. No. 16/536,064, filed Aug. 8, 2019 (now U.S. Pat. No. 11,488,149), which is incorporated herein by reference in its entirety.

BACKGROUND

A transaction card (e.g., a debit card, a credit card, and/or the like) may enable a card holder to pay a merchant for goods and/or services. In some situations, a virtual transaction card may be used in place of the transaction card. The virtual transaction card may be capable of processing transactions with a controlled payment number (e.g., in place of a transaction card number of the transaction card) that may be available for a limited number of transactions and/or for a limited time period.

SUMMARY

According to some implementations, a method may include receiving login credentials associated with a merchant account for a merchant, wherein the merchant account and the login credentials may be associated with a user. The method may include storing, in a credential mapping, the login credentials to map the login credentials to the merchant account and detecting an update event associated with a transaction setting of the merchant account, wherein the update event may correspond to updating the transaction setting with transaction account information associated with a transaction account of the user. The method may include navigating, based on detecting the update event, a browser to a merchant login interface of a merchant portal associated with the merchant, wherein the browser may be navigated using a navigation model. The method may include entering, using the navigation model, the login credentials into login fields of the merchant login interface to access a merchant account interface of the merchant, wherein the login credentials may be entered into the login fields based on the login credentials being stored in the credential mapping. The method may include navigating, using the navigation model, the merchant portal to access the transaction setting of the merchant account, and updating, using the navigation model, the transaction setting to include the transaction account information to permit the user to engage in the transaction using the transaction account.

According to some implementations, a device may include one or more memories and one or more processors, communicatively coupled to the one or more memories, to receive an authorization from a user to manage a transaction setting for a merchant account for a merchant, wherein the merchant account may be associated with the user. The one or more processors may receive, based on the authorization, login credentials associated with the merchant account, and determine that transaction account information for the merchant account is to be updated. The one or more processors may navigate, using a navigation model, a browser to a merchant portal associated with the merchant, and perform, using the navigation model and the login credentials, a login operation to log in to the merchant portal, wherein the navigation model may perform the login operation by accessing the login credentials from a credential mapping stored in a data structure of the device. The one or more processors may navigate, using the navigation model, the merchant portal, via the browser, to access the transaction setting of the merchant account, and update, using the navigation model, the transaction setting to include the transaction account information to permit a transaction associated with the user and the merchant to utilize the transaction account information.

According to some implementations, a non-transitory computer-readable medium may store one or more instructions that, when executed by one or more processors of a device, may cause the one or more processors to determine that transaction account information associated with a transaction account is to be updated, wherein the transaction account may be associated with a user. The one or more instructions may cause the one or more processors to identify a merchant account that is configured to use the transaction account for a transaction associated with the user and a merchant, and navigate, using a navigation model, a merchant portal to access the merchant account, wherein the merchant portal may be associated with the merchant. The one or more instructions may cause the one or more processors to perform, using the navigation model and login credentials for the merchant account, a login operation to access the merchant account, via the merchant portal, wherein the login credentials may be stored in a credential mapping that indicates an authorization to update the transaction account information to permit the transaction account information to be used in association with the merchant account. The one or more instructions may cause the one or more processors to update, using the navigation model, a transaction setting of the merchant account to include updated transaction account information for the transaction account.

According to some implementations, a method may include detecting that a user is accessing a merchant account via a first user session associated with a merchant portal, wherein the merchant account and the merchant portal may be associated with a merchant. The method may include receiving login credentials associated with the merchant account of the user to permit transaction account information to be used for a transaction associated with a transaction account of the user and the merchant, and launching, while the user browses the merchant portal via the first user session, a second user session associated with the merchant portal. The method may include navigating, using a navigation model, the merchant portal via the second user session to access a transaction setting for the merchant account, and updating, using the navigation model, the transaction setting to include the transaction account information to permit the user to engage in the transaction using the transaction account.

BRIEF DESCRIPTION OF THE DRAWINGS

FIGS. 4-7 are flowcharts of one or more example processes associated with management of credentials and authorizations for transactions.

DETAILED DESCRIPTION

Figure 1A:
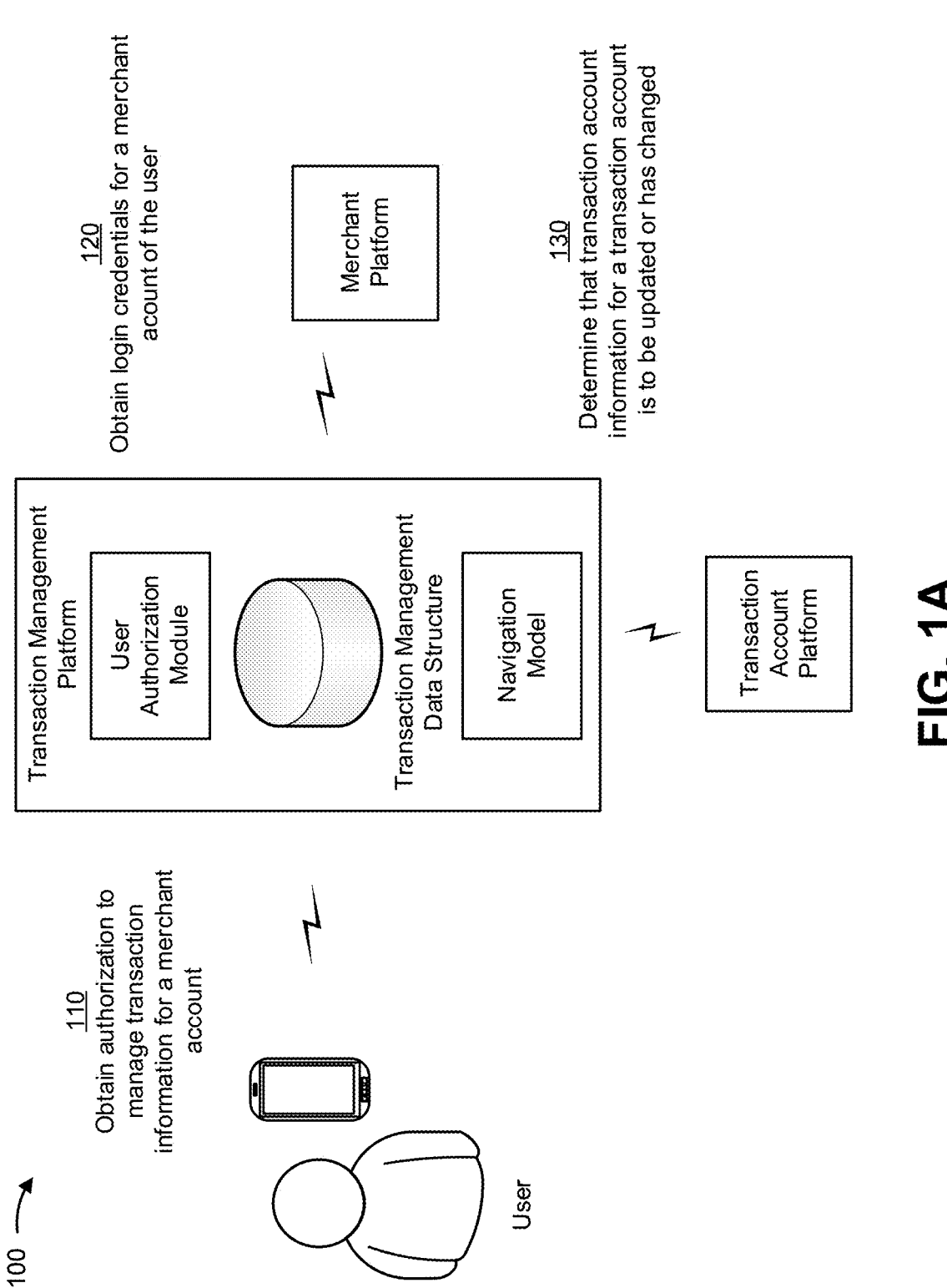
FIGS. 1A-1D are diagrams of an example implementation described herein.

The following detailed description of example implementations refers to the accompanying drawings. The same reference numbers in different drawings may identify the same or similar elements.

In many instances, a user may use a transaction account to engage in a transaction with a merchant. For example, the transaction account may be associated with a transaction card assigned to the user. The transaction card and/or transaction account may be associated with a financial institution (e.g., a bank, a credit union, and/or the like). In some instances, the user may engage in a transaction with the merchant via a merchant portal using the transaction account. For example, the user may provide, to the merchant portal, transaction account information of the transaction card and/or that is associated with the transaction account. Furthermore, the merchant portal may store the transaction account information to permit the user to reuse the transaction account for future transactions.

Furthermore, transaction account information for a transaction account may be changed or need to be changed. For example, this may occur due to an expiration of the transaction account information (e.g., expiration of card numbers of a transaction card or virtual transaction card for the transaction account), a breach in the security of the transaction account information, a change to the transaction account information (e.g., a new identification number is assigned to the transaction account, a new expiration date is assigned to the transaction account, and/or the like). Correspondingly, the transaction account information may need to be updated with the merchant portal to permit the user to continue to engage in transactions using the transaction account. In previous techniques, to update the transaction account information, the user may need to navigate through the merchant portal and/or provide the new transaction account information to engage in a subsequent transaction. In many instances, such a process further involves authenticating the user (e.g., via login credentials and/or other verification processes).

Some implementations described herein provide a transaction management platform that is capable of automatically updating transaction account information with a merchant via a merchant portal. For example, the transaction management platform may obtain authorization from a user to store and/or maintain login credentials for the merchant portal to permit the transaction management platform to automatically log in to the merchant portal, navigate to a transaction setting of the merchant portal, and update the transaction account information for a transaction account. In some implementations, the transaction account information may be updated by adding the transaction account information, setting the transaction account information to a default, replacing previous transaction account information with new transaction account information, and/or the like.

The transaction management platform, as described herein, may be configured to store and/or maintain login credentials associated with a user and one or more merchant accounts, along with transaction account information that is to be used in association with the one or more merchant accounts, in a data structure that is local to a user device associated with the user. In such cases, the transaction account information may be securely maintained with the user rather than, and/or in addition to, being secured with the merchant portal. Accordingly, the transaction account information may be stored in a manner that can prevent fraud and/or reduce the risk of fraudulent access to the transaction account information if there is a breach in security associated with the merchant portal. Furthermore, the transaction management platform may be configured to monitor online activity of the user, detect that the user is accessing the merchant portal, determine that transaction account information for the merchant portal is to be updated, look up login credentials associated with the merchant portal, and navigate the merchant portal to update the transaction account information while the user browses and/or performs one or more actions associated with the merchant portal. Accordingly, such a configuration of the transaction management platform may improve a user experience associated with engaging in transactions with a merchant portal by permitting the transaction account information that is to be used in a transaction between the user and the merchant to be updated in the background without the user having to spend time manually entering the transaction account information.

Additionally, or alternatively, the transaction management platform may be centrally located in a secured environment that is separate from the user device and/or the merchant portal. For example, the transaction management platform may be managed by (e.g., owned and/or operated by) a financial institution that is associated with the transaction account of the user. In such cases, the transaction management platform may proactively update and/or provide transaction account information (e.g., via one or more backend processes and/or platforms) to one or more merchants without the user having to access the merchant portal. Accordingly, such a configuration of the transaction management platform may improve security of the transaction account information by avoiding distribution of the transaction account information to merchant portals and/or a user device, which may be more susceptible to security breaches.

In some implementations, as described herein, the transaction management platform may utilize a navigation model (e.g., robotic process automation (RPA)) to interact with a user interface, an application, and/or a browser of a user device to manage transaction account information associated with the user. Accordingly, using some implementations described herein, computing resources and/or network resources may be preserved by obviating unnecessary communications of backend services that may unsuccessfully attempt to access and/or update transaction information due to lack of access to the user's credentials. Furthermore, avoiding such communications may prevent loss of the user information as the user information may be dropped due to a failure caused by attempting to use or communicate with an inaccessible backend service. Furthermore, examples herein may increase capacities of human agents that are to perform relatively tedious tasks, such as updating received information from chat bots and/or users, themselves, by freeing up time for the human agents to perform other tasks.

As used herein, a "merchant" may refer to an entity involved in the sale or leasing of goods or services. For example, a merchant may be a trader, a retailer, a vendor, a seller, a lessor, and/or the like.

FIGS. 1A-1D are diagrams of an example implementation 100 described herein. Example implementation 100 includes a user device, a transaction management platform, a merchant platform, and a transaction account platform. As further shown, the transaction management platform may include a user authorization module, a transaction management data structure, and a navigation model. According to some implementations, the transaction management platform and transaction account platform may be associated with a same entity (e.g., a same financial institution). Additionally, or alternatively, the transaction management platform and the merchant platform may be associated with a same entity (e.g., a same merchant).

As shown in FIG. 1A, and by reference number 110, the transaction management platform may obtain authorization to manage transaction information for a merchant account. For example, the transaction management platform may prompt (e.g., via the user authorization module) the user to authorize transaction management, as described herein, to permit the transaction management platform to automatically update transaction account information for use in transactions involving the merchant platform (and/or one or more other merchant platforms). According to some implementations, the transaction management platform may perform a verification process to authenticate that the user is an authorized user of the transaction account and/or merchant account. For example, the transaction management platform may utilize a verification process associated with the user device (e.g., using user credentials (e.g., a username, a password, a personal identification number (PIN), and/or the like) to unlock the user device, a biometric of the user, and/or the like). In this way, the transaction management platform may ensure that the user is authorizing the transaction management platform to manage transaction account information associated with one or more merchants.

As described herein, transaction management may involve managing transaction account information (e.g., an account number, a transaction card number, a transaction account expiration date, a card verification number, and/or the like) associated with a transaction account of a user. In some implementations, the transaction account may be a financial account (e.g., a credit account, a debit account, a loyalty member account, and/or the like). Correspondingly, the transaction account may be associated with a transaction card (e.g., a credit card, a debit card, a gift card, a customer loyalty card, and/or the like) for use at a transaction terminal (e.g., a payment terminal, a security gate, and/or the like).

In some implementations, the transaction account may be associated with (e.g., mapped or linked to) a virtual transaction account. The virtual transaction account may utilize one or more virtual transaction cards to process transactions using the transaction account (e.g., in place of using a physical transaction card). A virtual transaction account and/or a virtual transaction card may have a controlled transaction number (e.g., a payment number) that may be used to process transactions (e.g., payments, transfers of services, transfers of data, and/or the like), such as transactions made via the Internet (e.g., using a merchant portal). To reduce fraud, transaction account information associated with the virtual transaction account may be frequently changed (e.g., more frequently than transaction account information for physical transaction cards) and/or changed on-demand (e.g., to permit real-time transactions to use newly generated virtual transaction account information). For example, a virtual account identifier or number may expire within a shorter time period than a transaction identifier or number of a physical transaction card. Furthermore, sharing of transaction account information associated with the virtual account may be more secure than sharing transaction account information of a physical transaction card because transaction account information for the physical transaction card is typically updated less frequently than transaction account information for the virtual transaction account linked to the transaction account. A virtual transaction card may be specific to a single merchant, or a group of merchants. In some implementations, a virtual transaction card may be configured to have a particular spending limit (different from the linked transaction account). Furthermore, a virtual transaction card can be easily canceled without affecting the transaction account. Use of a virtual transaction card may prevent users from having to constantly update transaction account information separately, for every merchant that is to utilize the transaction account. In this way, the transaction account information may be associated with a transaction account and/or a virtual transaction account associated with the transaction account.

In some implementations, a user may provide authorization and/or enable monitoring of the user's online activity (and/or offline activity). For example, upon installing an application on the user device and/or accessing a browser of the user device, the application and/or browser may request (e.g., via an authentication token) that the user authorize monitoring of online activity and/or use of the user device. Such a request may indicate to the user device that the monitoring is for transaction management purposes (e.g., to permit transaction management according to example implementations described herein), fraud analysis/prevention purposes, and/or the like. With an approval authorizing the monitoring of the user's online activity (e.g., received via a user input from the user), the application may periodically (e.g., hourly, daily, and/or the like) or aperiodically (e.g., based on an event, such as the user opening a browser, performing a search through the browser, shopping online, accessing a merchant portal, engaging in a transaction with a particular merchant, and/or the like) determine whether transaction account information, for one or more transaction accounts that are to be used with one or more merchants, is to be updated. The request may enable the user to opt out of being monitored by the application.

In this way, the transaction management platform may receive an authorization from the user (e.g., and/or verify that the user is an authorized user) to manage a transaction setting for the user's merchant account associated with the merchant platform.

As further shown in FIG. 1A, and by reference number 120, the transaction management platform obtains login credentials for a merchant account of the user. The login credentials may permit the transaction management platform to access the merchant account via a merchant portal of the merchant platform (e.g., a merchant portal hosted by the merchant platform). For example, the login credentials may include a username for the merchant account, a password for the merchant account, profile information (e.g., a date of birth, an identification number, family/relationship information, and/or the like) of the user, security information associated with the user (e.g., personal information question and answer pairs, security verification codes and/or verification information, and/or the like), and/or the like. As described herein, the merchant portal may include a web-based portal that is accessible via a browser (e.g., one or more websites (and/or webpages) of the merchant, an online shopping interface of the merchant, and/or the like), an application portal that is accessible via an application of the user device (e.g., an application associated with the merchant, an online shopping application, and/or the like), and/or the like. The user device and/or transaction management platform may access the merchant portal via the Internet, an intranet, and/or any other type of network.

In some implementations, the transaction management platform may obtain the login credentials based on receiving authorization from the user to permit the transaction management platform to manage transaction account information for transactions involving the merchant platform and/or a transaction account associated with the user. For example, the transaction management platform may prompt (e.g., via the user authorization module) a user to provide login credentials in association with an authorization to manage transaction account information, as described herein.

In some implementations, the transaction management platform stores the login credentials in a credential mapping of the transaction management data structure (as shown in and described in connection with FIG. 1B). The login credentials may be mapped to the merchant account in the credential mapping. Additionally, or alternatively, transaction account information for transactions involving the merchant account may be mapped to the login credentials and/or the merchant.

According to some implementations, the login credentials may be received and/or stored in the credential mapping based on the user manually accessing and/or logging into a merchant portal of the merchant platform. For example, the transaction management platform may monitor online activity of the user and detect that the user is accessing the merchant portal of the merchant platform. In such a case, based on detecting that the user is accessing the merchant portal, the transaction management platform may prompt or request the user to authorize storage of the login credentials for the merchant account.

As described herein, the transaction management platform may be configured to monitor activity of the user (e.g., online activity, usage of the user device (or applications of the user device, and/or the like)). For example, the transaction management platform may be included within or associated with a browser extension of a browser of the user device. Such a browser extension may be configured to monitor online activity and detect that the user is accessing the merchant platform (and/or any other merchant platform) based on analyzing and/or identifying an address (e.g., a uniform resource locator (URL), an internet protocol (IP) address, and/or the like) of the merchant portal, a hyperlink of the merchant portal, an identifier (e.g., a name, a logo, and/or the like) of the merchant (e.g., an identifier that is included within the merchant portal), and/or the like. In such cases, the transaction management platform (e.g., via the user authorization module) may detect that the user is accessing the merchant portal via the browser, and prompt the user to authorize receipt and/or storage of the user's login credentials.

Additionally, or alternatively, the transaction management platform may be configured as an application of the user device that monitors usage of the user device and/or user access to one or more other applications of the user device (and/or browsers of the user device), such as one or more applications associated with the merchant platform and/or merchant portal. In such cases, the transaction management platform may similarly determine that the user is accessing the merchant portal based on the user accessing an application associated with the merchant portal, and prompt the user to authorize receipt and storage of the user's login credentials.

In this way, the transaction management platform may obtain login credentials for a merchant account of the user to permit the transaction management platform to use the login credentials to manage transaction account information for a merchant account.

As further shown in FIG. 1A, and by reference number 130, the transaction management platform may determine that transaction account information for a transaction account of the user is to be updated or has changed. For example, the transaction management platform may monitor for and/or detect an update event associated with a transaction setting of the merchant account. Such an update event may include a change to a transaction number (e.g., a transaction card number, a virtual account transaction number, and/or the like), a change to an expiration of the transaction account, a security breach, and/or the like. As described herein, an update event may correspond to transaction account information and/or a transaction setting needing to be updated (e.g., to permit a transaction associated with the merchant to use the transaction account, to prevent a security breach, and/or the like).

In some implementations, the transaction management platform may access and/or receive information from the transaction account platform to monitor one or more characteristics of the transaction account. More specifically, the transaction management platform may access information indicating a change to a transaction number of the transaction account, information indicating whether the transaction account has been closed or cancelled, information identifying an expiration associated with the transaction account, information indicating virtual transaction account information for the transaction account, information associated with security of the transaction account, and/or the like. Such information may be received via one or more notifications from the transaction account platform. Accordingly, based on information from and/or access to the transaction account platform, the transaction management platform may determine that transaction account information for the transaction account is to be updated.

In some implementations, the transaction management platform may determine that the transaction account information for the transaction account has expired. For example, the transaction management platform may determine that an expiration date assigned to the transaction account has passed. Additionally, or alternatively, the transaction management platform may determine that a virtual transaction account number for the transaction account is expired and/or has been changed to a new virtual transaction account number (e.g., based on an expiration date associated with the virtual transaction account number passing). In some implementations, the transaction management platform may determine that a new transaction account associated with the user has been opened. For example, the transaction management platform may receive an indication from the transaction account platform that the user has opened a new account with a financial institution associated with the transaction account platform. In such cases, the transaction management platform may prompt and/or request the user to indicate whether the new transaction account should be used in association with transactions involving the merchant.

In some implementations, the transaction management platform may be configured to monitor the transaction account platform, the merchant account platform, and/or one or more other platforms (e.g., one or more news platforms, newsfeeds, search engines, and/or the like) for information indicating whether the transaction account may have experienced a security breach. For example, the transaction management platform may access and/or receive information indicating that the transaction account has been breached (e.g., based on detected fraudulent access to the transaction account, fraudulent use of the transaction account, fraudulent transactions involving the transaction account, and/or the like). According to some implementations, the transaction management platform may be configured to monitor and/or receive notifications from the transaction account platform that are associated with one or more types of security breaches (e.g., security breaches involving a financial institution associated with the transaction account platform, security breaches associated with a type of account of the transaction account, security breaches associated with specific access to the transaction account, and/or the like).

Additionally, or alternatively, the transaction management platform may be configured to monitor and/or receive notifications from the merchant platform that one or more merchant accounts, including the merchant account of the user, may have experienced a security breach. Based on such notifications, the transaction management platform may infer that the transaction account associated with and/or used for transactions involving the merchant has been breached. In some implementations, if the transaction account information associated with a transaction account is not stored with and/or maintained in a transaction setting of the merchant account, the transaction management platform may determine that the transaction account information that was previously used in a transaction associated with the merchant account has not been breached.

In some implementations, the transaction management platform may be configured to monitor for security breaches associated with the merchant via one or more online platforms such as news platforms, websites, search engines (e.g., via one or more periodic search queries associated with the merchant), and/or the like. For example, the transaction management platform may use one or more models to detect potential security breaches. The one or more models may include a natural language processing (NLP) model, a machine learning model, and/or other type of artificial intelligence model that is configured to analyze information associated with (e.g., hosted on, broadcasted from, and/or the like) the one or more online platforms to detect a potential security breach. In this way, the transaction management platform may utilize one or more third-party sources to detect a potential security breach that may have put the security of the transaction account information associated with the transaction account and/or merchant account at risk. Therefore, based on detecting potential security breaches involving the transaction account information of a transaction account, the transaction management platform may determine that the transaction account information is to be updated (e.g., to prevent future or further security breaches associated with the transaction account).

In some implementations, the transaction management platform may determine that the transaction account information for a transaction account is to be updated based on a user input from the user device. For example, the user may provide a user input that specifies that transaction account information for the transaction account is to be updated. Such a user input may indicate that the transaction account information is to be changed, that the transaction account is to be set as the default transaction account for transactions involving the merchant, that new transaction account information is to replace old transaction account information for the transaction account, and/or the like. Furthermore, based on the user indicating that transaction account information is to be updated and/or changed, the transaction management platform may determine (e.g., automatically) that a transaction setting of the merchant account is to be correspondingly updated.

According to some implementations, based on detecting that the transaction account information is to be updated for a merchant account, the transaction management platform may generate new transaction account information for the transaction account. For example, when the transaction account information includes virtual transaction account information, the transaction management platform may generate new virtual transaction account information for the transaction account (e.g., using any suitable virtual transaction account information techniques). Additionally, or alternatively, the transaction management platform may replace a primary transaction card with a virtual transaction card, replace a virtual transaction card with a primary transaction card, replace a primary transaction card with another primary transaction card, and/or the like. As described herein, in such cases, the transaction management platform may generate a new virtual transaction account identifier, set a new virtual transaction account expiration (e.g., a date, a period of time, a number of transactions, and/or the like that, once expired, cause of the expiration of and/or prevent use of the new virtual transaction account identifier). Accordingly, the transaction management platform may enable continued use of the transaction account in transactions with the merchant (e.g., without requiring a user and/or the user needing to manually update the transaction account information) using new transaction account information that is automatically generated based on detecting the need to change and/or update the transaction account information for the transaction account.

In this way, the transaction management platform may determine that transaction account information (and/or a transaction setting associated with a merchant) is to be updated to permit the user to engage in a transaction with the merchant.

Figure 1B:
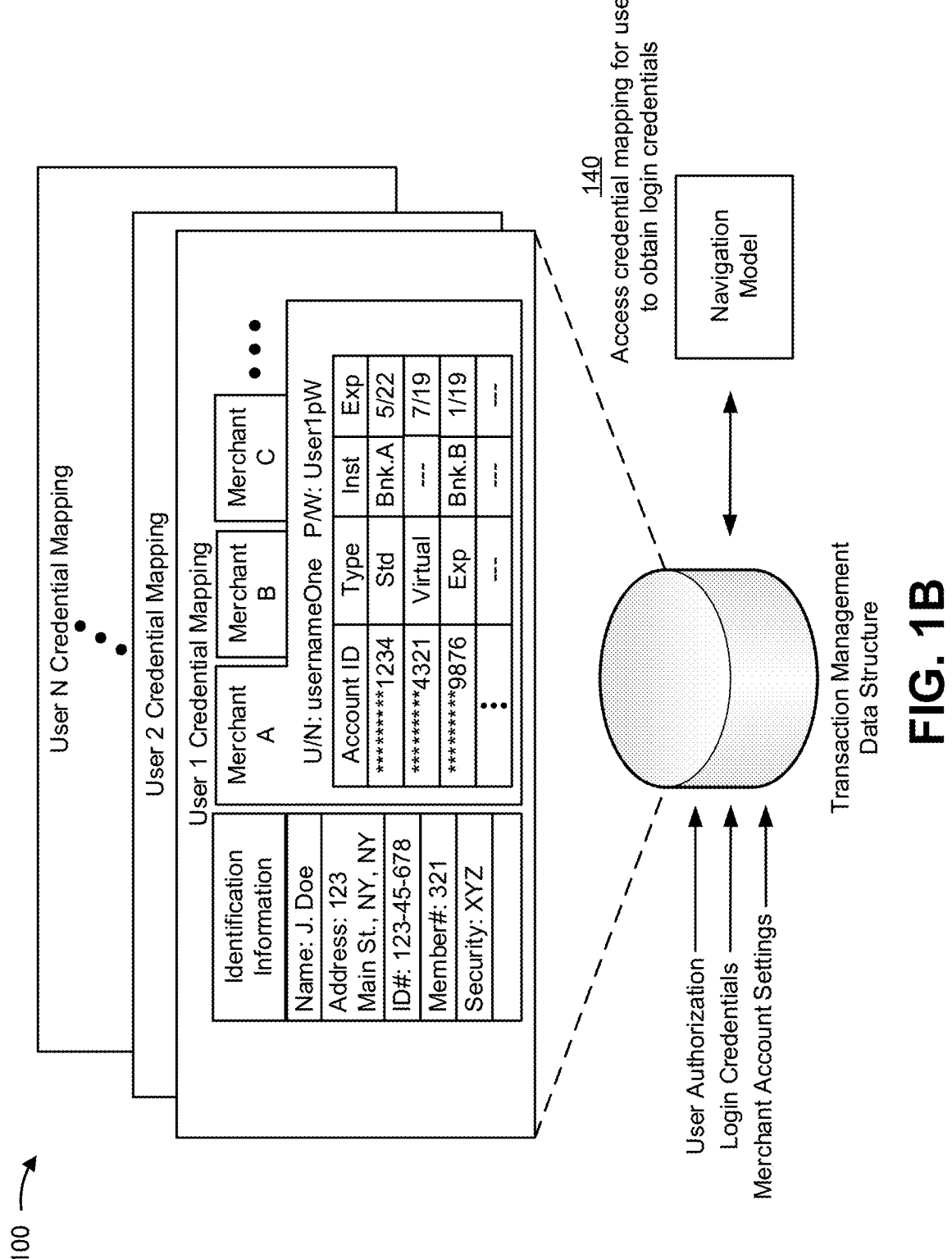

As shown in FIG. 1B, and by reference number 140, the transaction management platform (e.g., via the navigation model) may access the credential mapping for the user to obtain login credentials for the merchant. As shown, the transaction management data structure includes a credential mapping for one or more users (User 1 to User N, where N corresponds to the number of users associated with and/or that have authorized the transaction management platform to manage transaction account information for transactions between the users and one or more merchants). Assuming the example user and the example merchant corresponds to User 1 and Merchant A, respectively, the credential mapping for the user's account with the merchant indicates that the username for the merchant account is "usernameOne" and that the password is "User1pw" and that a transaction setting for the merchant account includes transaction account information for three transaction accounts of the user. As further shown in the example of FIG. 1B, the credential mapping for the user may include identification information associated with the user.

As described herein, the transaction management platform may access the credential mapping for the user based on receiving authorization from the user and/or detecting that the user is accessing a merchant portal associated with the merchant. Accordingly, when the transaction management platform detects that the user is accessing the merchant portal, the navigation model may obtain login credentials associated with the merchant portal that can be used to permit the transaction management platform to access the transaction setting of the merchant account. The transaction management platform may navigate the credential mapping and select login credentials for the merchant (Merchant A) from the plurality of respective login credentials for the merchants (Merchant A, Merchant B, Merchant C, etc.) associated with the user. In this way, the transaction management platform may (based on detecting the merchant from the user's access to the merchant portal) identify the corresponding transaction accounts used in transactions involving the merchant, and perform a login operation based on the credential mapping identifying that the login credentials are associated with the merchant account.

In some implementations, the transaction management platform may be configured to scan and/or analyze the credential mapping to detect which merchant accounts are configured to use a particular transaction account for transactions associated with the user. For example, based on the transaction management platform detecting that the transaction account information for the transaction account ending in "4321" is to be updated, the transaction management platform may determine that the transaction setting for Merchant A is to be correspondingly updated. In this way, the transaction management platform may ensure that transaction settings can be updated for any merchant accounts that include or are to use a transaction account that has experienced an update event (e.g., to update transaction account information for the transaction accounts).

In some implementations, the transaction management platform may access the transaction setting (using the login credentials) for the merchant account in a background of the user session of the merchant portal. For example, when the transaction management platform determines that the user is accessing the merchant portal, the transaction management platform may open a new browser window (and/or a separate browser window from a browser window of the user session), to permit the transaction management platform to access the transaction setting for the merchant account without interrupting the user session. Additionally, or alternatively, the transaction management platform may access the transaction setting via one or more backend processes and/or platforms. In such cases, the transaction management platform may access the transaction setting without utilizing a user interface and/or a browser (e.g., via one or more communication links and/or networks that are established between the transaction management platform and the merchant platform).

In this way, the transaction management platform may access login credentials for the merchant account to permit the transaction management platform to update a transaction setting for the merchant account (e.g., to include transaction account information associated with a transaction account of the user).

Figure 1C:
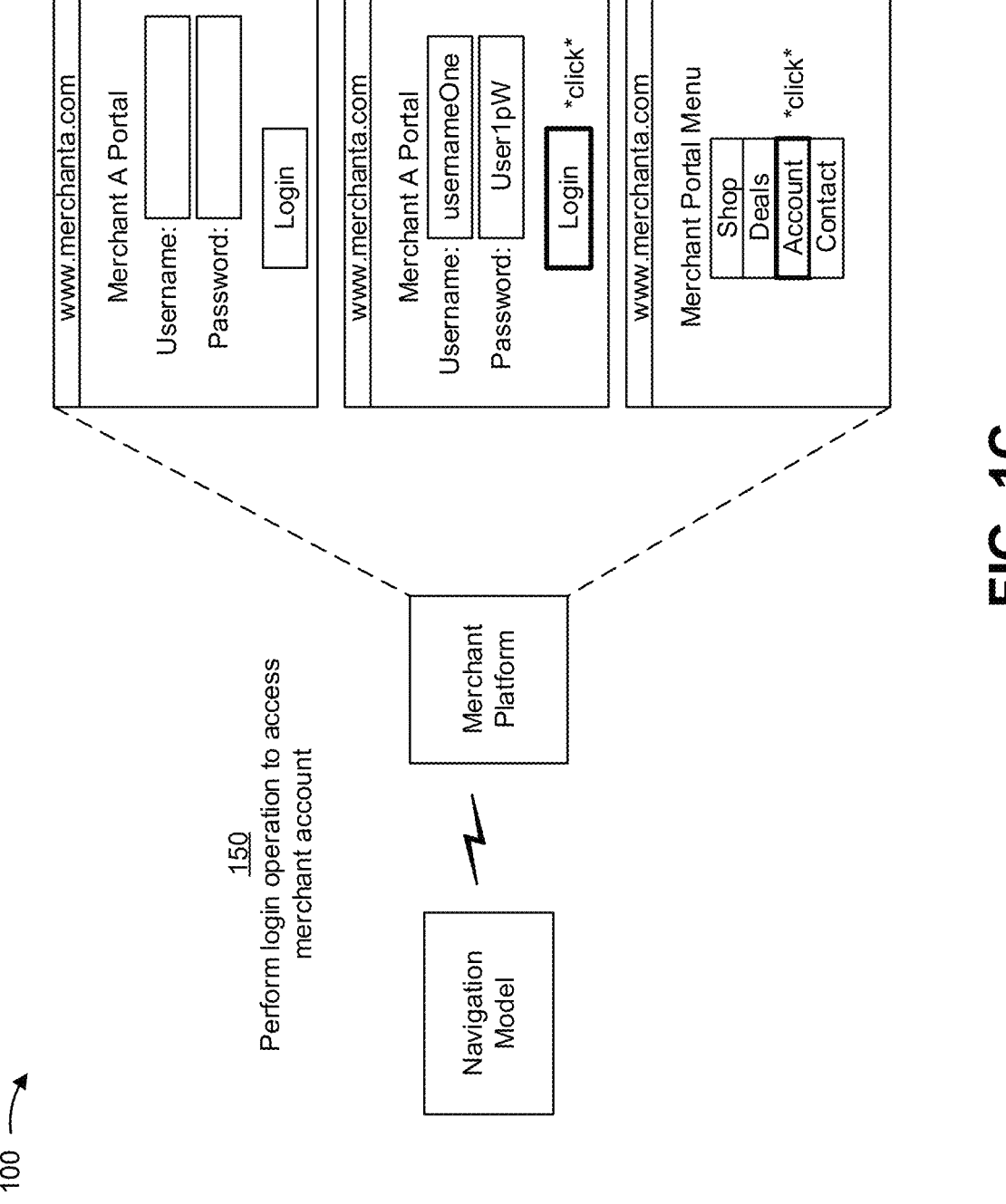

As shown in FIG. 1C, and by reference number 150, the transaction management platform (e.g., using the navigation model) performs a login operation to access the merchant account. For example, as shown, the transaction management platform may access a merchant login interface of the merchant portal, enter the username and password for the user, log in to the merchant portal (e.g., by executing the login command (clicking the "Login" button)), and access the merchant account (e.g., by executing an account access command (clicking the "Account" button)). As described herein, the transaction management platform may perform and/or select the login credentials for the merchant portal from the credential mapping of the user.

According to some implementations, the navigation model of the transaction management platform may be configured to utilize a browser and/or navigate (e.g., based on detecting an update event associated with the transaction account and/or a transaction setting of the merchant account (because the transaction setting includes transaction account information associated with the transaction account), and/or the like) the browser of the user device to the merchant login interface. The browser may be hosted on the user device (e.g., if the transaction management platform is hosted by the user device) and/or a server device (e.g., if the transaction management platform is associated with the transaction account platform and/or other cloud-based platform) to permit access to the Internet and/or the merchant portal.

Accordingly, the navigation model may open and/or access a browser and navigate an interface of the browser to reach the merchant account of the merchant portal. For example, to utilize and/or navigate the browser, the navigation model may be configured to enter a URL of the merchant portal (and/or of a merchant login interface), enter information (e.g., user credentials) in fields of the browser and/or the merchant portal (e.g., a username field, a password field, an address field, a search field, and/or the like), execute clickables of the merchant portal (e.g., the "Login" button, the "Account" button, and/or the like), and/or the like. In this way, the transaction management platform may use the navigation model to access the merchant account of the user via the merchant portal.

In some implementations, the navigation model may use a RPA to navigate the browser, enter the login credentials, navigate the merchant portal, and/or update a transaction setting of the merchant account as described herein. For example, the transaction management platform may utilize and/or cause an RPA to access a user input and/or application associated with the data management platform involved in the operation. More specifically, the transaction management platform may instruct the RPA to log in to the merchant portal (e.g., based on login information requested and/or received from the user), and navigate the user interface of the merchant portal to identify elements of the merchant portal that correspond to updating a transaction setting of the merchant account. In some implementations, the RPA may be specifically configured for the merchant platform and/or merchant portal (e.g., based on the type of merchant portal, the user interface of the merchant portal, and/or the like). Additionally, or alternatively, the RPA may be configured specifically for a browser and/or operating system that is to be used to access the merchant portal and/or a transaction setting of a merchant account.

In some implementations, based on the transaction management platform obtaining relevant information associated with the transaction account and/or merchant account (e.g., authorization from the user, login credentials of the user, transaction account information for a transaction account, information indicating that transaction account information for a transaction account is to be updated, information indicating that a transaction setting for the merchant account is to be updated, and/or the like), the transaction management platform may access and/or process information from the credential mapping to provide and/or update transaction account information for a merchant account as described herein. The transaction management platform may utilize the information in the fields of the transaction management data structure to cause corresponding information to be updated and/or maintained in a transaction setting of the merchant portal.

Accordingly, the transaction management platform, using the information from the credential mapping of the user, may cause the RPA to navigate the merchant portal and enter appropriate information in appropriate fields of the merchant portal. Referring to the example above, the transaction management platform may use an RPA to identify fields that enable user access to the merchant portal, enter the login credentials, and access a merchant account of the user.

Figure 1D:
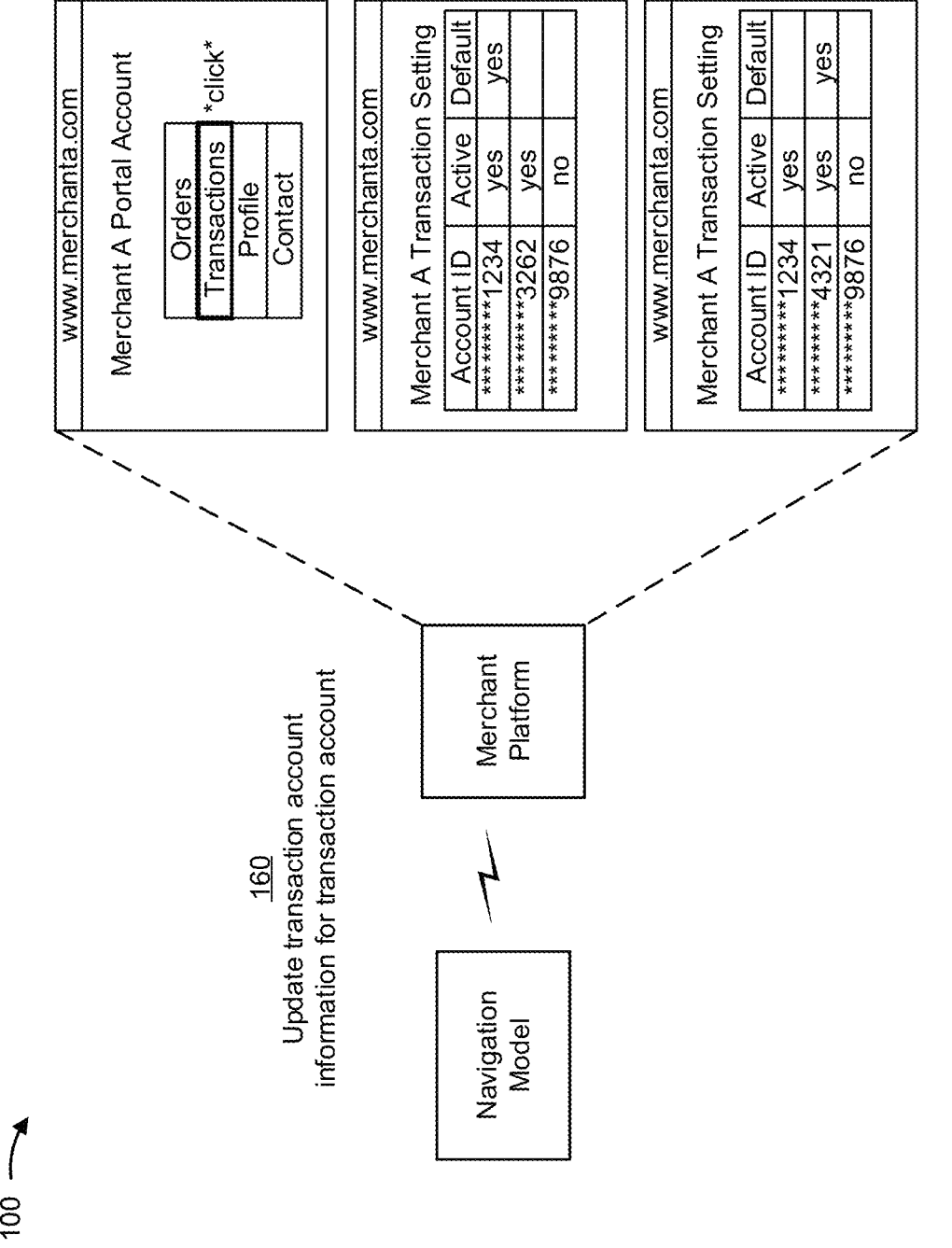

As shown in FIG. 1D, and by reference number 160, the transaction management platform may update the transaction account information for the transaction account in the transaction setting of the merchant account. As shown, the transaction management platform (e.g., using the navigation model) may navigate the merchant portal to access the transaction settings of the merchant account (e.g., by executing the "Transactions" button). In example implementation 100, assuming that the transaction account ending in "3262" is to be updated with new transaction account information, the transaction management platform may identify the transaction account information for the transaction account, edit the transaction account information field (e.g., the "Account ID" field) for the transaction account to include the new transaction account information (with a transaction account number ending in "4321"), and save the update to the transaction setting to permit the transaction account to be used in a future transaction between the user and/or the merchant. Furthermore, as shown in the example, the transaction management platform may update the transaction setting to set the transaction account to be the default transaction account for transactions between the user and the merchant.

The transaction management platform may utilize an RPA (the same RPA and/or a different RPA of the navigation model that was used to access the transaction account) to update the transaction account information. For example, to update the transaction account information in the transaction setting of the merchant and/or set the transaction account as the default account, the transaction management platform may cause the RPA to identify an "update transaction information" element (not shown) of the merchant portal and cause the RPA to navigate to the "update transaction information" element to insert and/or edit the transaction account information from the credential mapping to effectively update the transaction setting of the merchant account. In this way, the user may engage (or continue to engage) in transactions using the transaction account without having to manually update the transaction information.

As described herein, the transaction setting may be updated by at least one of adding transaction account information for a transaction account to the transaction setting of the merchant account, setting the transaction account (and/or transaction account information for the transaction account) as a default account for transactions involving the merchant, replacing previous transaction account information for the transaction account (and/or updating virtual transaction account information for the transaction account), and/or the like.

In some implementations, after a user session associated with the merchant portal (e.g., after the user closes a browser window of the merchant portal, after the user closes an application associated with the merchant portal, after the user engages in a transaction via the merchant portal, and/or the like), the transaction management platform (e.g., using the navigation model) may remove the transaction account information from the transaction setting of the transaction account. For example, to prevent the merchant from storing and/or maintaining transaction account information for transactions with the user, the transaction management platform may use an RPA to access the transaction setting (as described above) and remove the transaction account information associated with the transaction account. In this way, transaction account information may only be temporarily stored (e.g., during a user session of the merchant portal) with a merchant and/or for a merchant account, thus improving security of the transaction account and/or transaction account information, while preventing the need for the user to enter and/or remove the transaction account information for each transaction made via the merchant portal. In other words, some implementations described herein permit the transaction management platform to provide transaction account information for one-time use via the merchant portal. In such cases, the transaction account information may be more secure, thus conserving resources that may otherwise have to be used to address any fraud and/or generate new transaction account information (e.g., including new virtual transaction account information).

In some implementations, the transaction management platform may use machine learning to cause the RPA to update a transaction setting of a merchant portal, as described herein. For example, the transaction management platform may use a machine learning model to identify one or more elements of a user interface of the merchant portal, one or more elements of a backend process or backend system, and/or the like that can be used to update the transaction account information. The transaction management platform may train the machine learning model based on one or more RPA parameters associated with user interface elements (e.g., the types of the user interface elements, the functions of the user interface elements, and/or the like) of merchant portals, types of merchant portals, one or more characteristics of merchant portals, one or more characteristics of transaction accounts (e.g., types, such as credit, debit, and/or the like, whether associated with a virtual account, and/or the like), one or more characteristics of the update to the transaction setting (e.g., adding transaction account information, setting transaction account information as default for transactions, replacing transaction account information, and/or the like), and/or the like. Furthermore, the transaction management platform may train the machine learning model using historical data associated with identifying the one or more elements of user interfaces of merchant portals, one or more elements of backend processes and/or backend systems, and/or the like according to the one or more RPA parameters. Using the historical data and the one or more RPA parameters as inputs to the navigation model, the transaction management platform may perform one or more operations, as described herein, to update a transaction setting of a merchant account and/or transaction account information associated with a transaction account.

Accordingly, the transaction management platform may utilize and/or include one or more modules that are configured to update a transaction setting for a merchant account and/or transaction account information associated with a transaction account for use in transactions with the merchant. In this way, relative to previous techniques, the transaction management platform improves a user experience associated with providing and/or updating a transaction setting for a merchant account and/or improves security of a transaction account and/or transaction account information associated with the merchant account. Correspondingly, the transaction management platform may conserve computing resources and/or network resources associated with requiring users to manually update a transaction setting associated with a merchant account, computing resources and/or network resources associated with addressing fraudulent access to the transaction account, and/or the like.

As indicated above, FIGS. 1A-1D are provided as one or more examples. Other examples may differ from what is described with regard to FIGS. 1A-1D.

Figure 2:
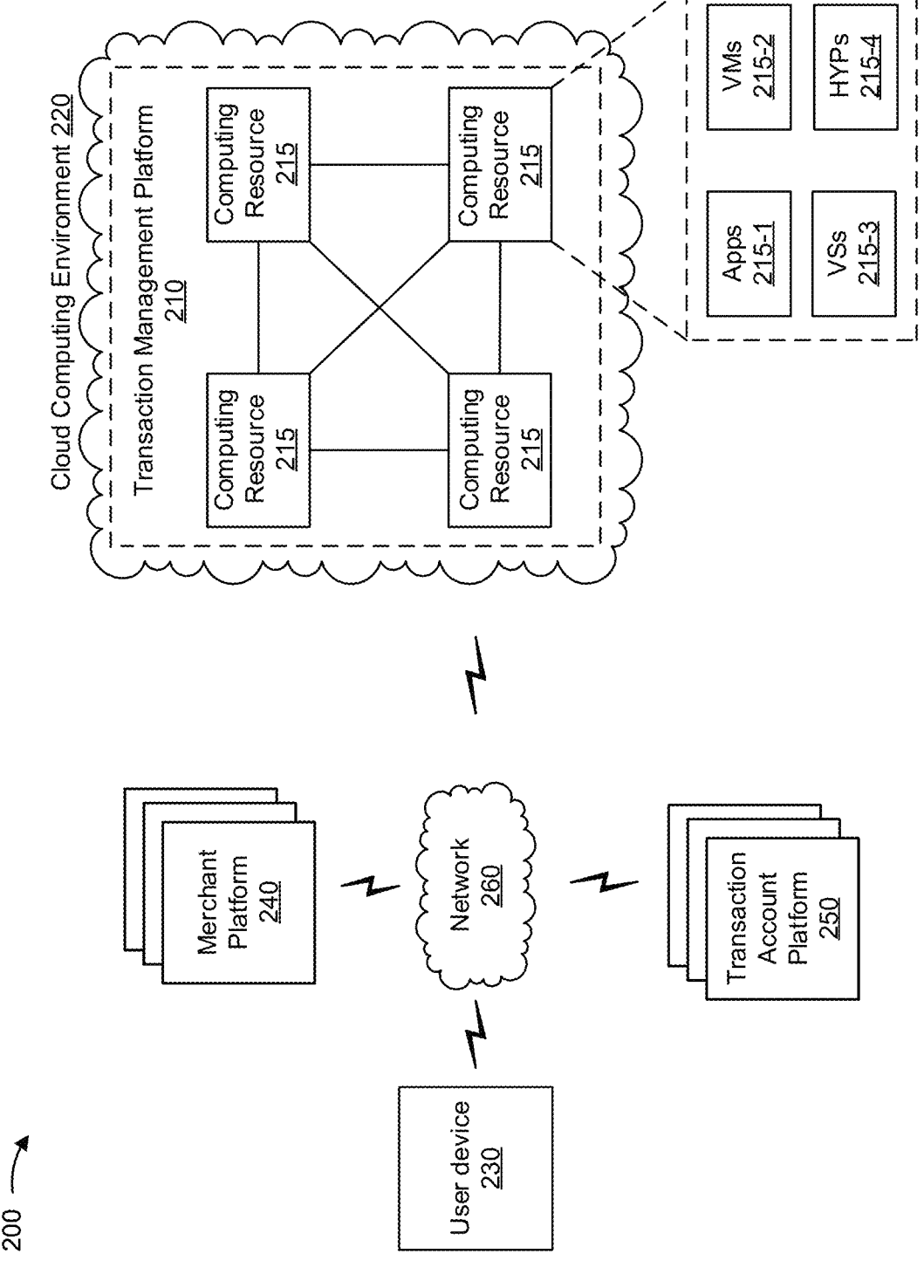
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction management platform 210, a computing resource 215, a cloud computing environment 220, a user device 230, one or more merchant platforms 240 (referred to herein individually as "merchant platform 240" or collectively as "merchant platforms 240"), one or more transaction account platforms 250 (referred to herein individually as "transaction account platform 250" or collectively as "transaction account platforms 250"), and a network 260. Devices of environment 200 may interconnect via wired connections, wireless connections, or a combination of wired and wireless connections.

Transaction management platform 210 includes one or more computing resources assigned to provide management of login credentials and authorizations for transactions associated with one or more merchant platforms. For example, transaction management platform 210 may be a platform implemented by cloud computing environment 220 that may receive authorization and/or login credentials associated with a user, determine that a transaction setting associated with a merchant account is to be updated, and update the transaction setting using the login credentials. In some implementations, transaction management platform 210 is implemented by computing resources 215 of cloud computing environment 220.

Transaction management platform 210 may include a server device or a group of server devices. In some implementations, transaction management platform 210 may be hosted in cloud computing environment 220. Notably, while implementations described herein may describe transaction management platform 210 as being hosted in cloud computing environment 220, in some implementations, transaction management platform 210 may be non-cloud-based or may be partially cloud-based.

Cloud computing environment 220 includes an environment that delivers computing as a service, whereby shared resources, services, and/or the like may be provided to user device 230, merchant platform(s) 240, and/or transaction account platform(s) 250. Cloud computing environment 220 may provide computation, software, data access, storage, and/or other services that do not require end-user knowledge of a physical location and configuration of a system and/or a device that delivers the services. As shown, cloud computing environment 220 may include transaction management platform 210 and computing resource 215.

Computing resource 215 includes one or more personal computers, workstation computers, server devices, or another type of computation and/or communication device. In some implementations, computing resource 215 may host transaction management platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on user device 230. For example, application 215-1 may include software associated with transaction management platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., user device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

User device 230 includes one or more devices capable of receiving, generating, storing, processing, and/or providing information associated with performing transactions, authorizing transactions, and/or the like. For example, user device 230 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Merchant platform 240 may include one or more devices capable of receiving, generating, storing, processing, and/or providing information associated with a merchant, such as information described herein. For example, merchant platform 240 may include a laptop computer, a tablet computer, a desktop computer, a server device, a group of server devices, or a similar type of device, associated with a merchant, a financial institution, and/or the like. In some implementations, merchant platform 240 may receive information from and/or transmit information to transaction management platform 210, user device 230, and/or transaction account platform 250. Merchant platform 240 may be associated with a merchant account and a merchant portal for accessing the merchant account.

Transaction account platform 250 may include one or more devices capable of receiving, generating, storing, processing, and/or providing information associated with a transaction account (e.g., of a user of user device 230), such as information described herein. For example, transaction account platform 250 may include a laptop computer, a tablet computer, a desktop computer, a server device, a group of server devices, or a similar type of device, associated with a transaction account, a financial institution, and/or the like. In some implementations, transaction account platform 250 may receive information from and/or transmit information to transaction management platform 210, user device 230, and/or merchant platform 240.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
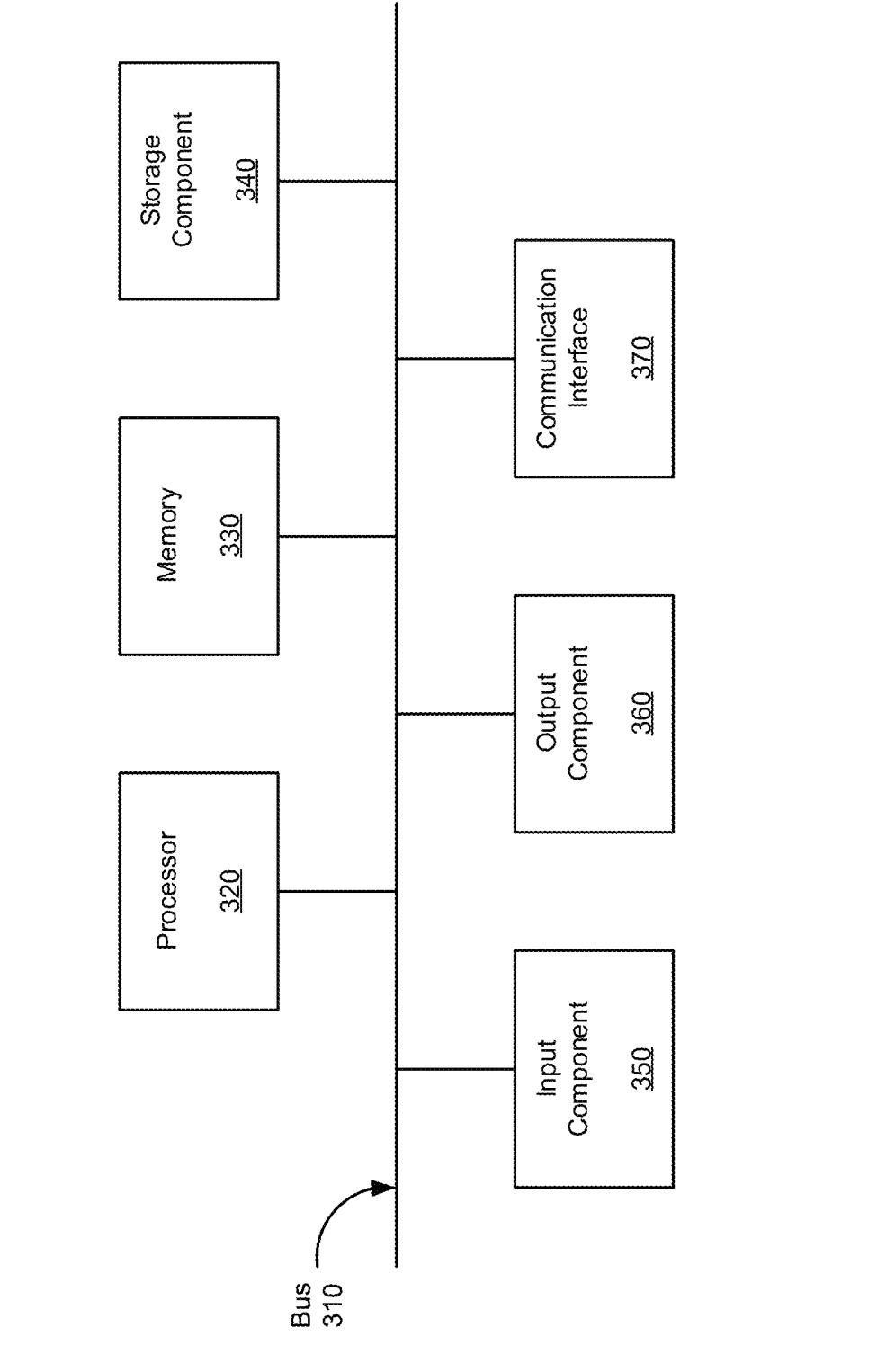
FIG. 3 is a diagram of example components of one or more devices of FIG. 2.

FIG. 3 is a diagram of example components of a device 300. Device 300 may correspond to transaction management platform 210, computing resource 215, user device 230, merchant platform 240, and/or transaction account platform 250. In some implementations, transaction management platform 210, computing resource 215, user device 230, merchant platform 240, and/or transaction account platform 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magnetooptic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for management of credentials and authorizations for transactions. In some implementations, one or more process blocks of FIG. 4 may be performed by a transaction management platform (e.g., transaction management platform 210). In some implementations, one or more process blocks of FIG. 4 may be performed by another device or a group of devices separate from or including the transaction management platform, such as a user device (e.g., user device 230), a merchant platform (e.g., merchant platform 240), a transaction account platform (e.g., transaction account platform 250), and/or the like).

As shown in FIG. 4, process 400 may include receiving login credentials associated with a merchant account for a merchant, wherein the merchant account and the login credentials are associated with a user (block 410). For example, the transaction management platform (e.g., using computing resource 215, processor 320, memory 330, storage component 340, input component 350, output component 360, communication interface 370, and/or the like) may receive login credentials associated with a merchant account for a merchant, as described above. In some implementations, the merchant account and the login credentials may be associated with a user.

As further shown in FIG. 4, process 400 may include storing, in a credential mapping, the login credentials to map the login credentials to the merchant account (block 420). For example, the transaction management platform (e.g., using computing resource 215, processor 320, memory 330, storage component 340, input component 350, output component 360, communication interface 370, and/or the like) may store, in a credential mapping, the login credentials to map the login credentials to the merchant account, as described above.

As further shown in FIG. 4, process 400 may include detecting an update event associated with a transaction setting of the merchant account, wherein the update event corresponds to updating the transaction setting with transaction account information associated with a transaction account of the user (block 430). For example, the transaction management platform (e.g., using computing resource 215, processor 320, memory 330, storage component 340, input component 350, output component 360, communication interface 370, and/or the like) may detect an update event associated with a transaction setting of the merchant account, as described above. In some implementations, the update event may correspond to updating the transaction setting with transaction account information associated with a transaction account of the user.

As further shown in FIG. 4, process 400 may include navigating, based on detecting the update event, a browser to a merchant login interface of a merchant portal associated with the merchant, wherein the browser is navigated using a navigation model (block 440). For example, the transaction management platform (e.g., using computing resource 215, processor 320, memory 330, storage component 340, input component 350, output component 360, communication interface 370, and/or the like) may navigate, based on detecting the update event, a browser to a merchant login interface of a merchant portal associated with the merchant, as described above. In some implementations, the browser may be navigated using a navigation model.

As further shown in FIG. 4, process 400 may include entering, using the navigation model, the login credentials into login fields of the merchant login interface to access a merchant account interface of the merchant, wherein the login credentials are entered into the login fields based on the login credentials being stored in the credential mapping (block 450). For example, the transaction management platform (e.g., using computing resource 215, processor 320, memory 330, storage component 340, input component 350, output component 360, communication interface 370, and/or the like) may enter, using the navigation model, the login credentials into login fields of the merchant login interface to access a merchant account interface of the merchant, as described above. In some implementations, the login credentials may be entered into the login fields based on the login credentials being stored in the credential mapping.

As further shown in FIG. 4, process 400 may include navigating, using the navigation model, the merchant portal to access the transaction setting of the merchant account (block 460). For example, the transaction management platform (e.g., using computing resource 215, processor 320, memory 330, storage component 340, input component 350, output component 360, communication interface 370, and/or the like) may navigate, using the navigation model, the merchant portal to access the transaction setting of the merchant account, as described above.

As further shown in FIG. 4, process 400 may include updating, using the navigation model, the transaction setting to include the transaction account information to permit the user to engage in a transaction using the transaction account (block 470). For example, the transaction management platform (e.g., using computing resource 215, processor 320, memory 330, storage component 340, input component 350, output component 360, communication interface 370, and/or the like) may update, using the navigation model, the transaction setting to include the transaction account information to permit the user to engage in a transaction using the transaction account, as described above.

Process 400 may include additional implementations, such as any single implementation or any combination of implementations described below and/or in connection with one or more other processes described elsewhere herein.

In a first implementation, the update event may be detected based on a user input specifying that the transaction setting of the merchant account is to be updated.

In a second implementation, alone or in combination with the first implementation, the transaction account information may comprise new transaction information associated with a virtual transaction account of the user, and the update event may correspond to an expiration of previous transaction information associated with the virtual transaction account.

In a third implementation, alone or in combination with one or more of the first and second implementations, the transaction account information may comprise at least one of: a new account identifier associated with the transaction account, wherein the transaction account is a virtual transaction account; or new expiration information associated with the new account identifier, wherein the new account identifier and the new expiration information may be generated based on the update event being detected.

In a fourth implementation, alone or in combination with one or more of the first through third implementations, the login credentials may be stored in the credential mapping based on receiving a user input authorizing storage of the login credentials for use in automatically updating the transaction setting based on the update event.

In a fifth implementation, alone or in combination with one or more of the first through fourth implementations, the navigation model may be configured to use a RPA to navigate the browser, enter the login credentials, navigate the merchant portal, and update the transaction setting.

In a sixth implementation, alone or in combination with one or more of the first through fifth implementations, the RPA may be specifically configured to update the transaction setting for the merchant account via the browser.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 for management of credentials and authorizations for transactions. In some implementations, one or more process blocks of FIG. 5 may be performed by a transaction management platform (e.g., transaction management platform 210). In some implementations, one or more process blocks of FIG. 5 may be performed by another device or a group of devices separate from or including the transaction management platform, such as a user device (e.g., user device 230), a merchant platform (e.g., merchant platform 240), a transaction account platform (e.g., transaction account platform 250), and/or the like.

As shown in FIG. 5, process 500 may include receiving an authorization from a user to manage a transaction setting for a merchant account for a merchant, wherein the merchant account is associated with the user (block 510). For example, the transaction management platform (e.g., using computing resource 215, processor 320, memory 330, storage component 340, input component 350, output component 360, communication interface 370, and/or the like) may receive an authorization from a user to manage a transaction setting for a merchant account for a merchant, as described above. In some implementations, the merchant account may be associated with the user.

As further shown in FIG. 5, process 500 may include receiving, based on the authorization, login credentials associated with the merchant account (block 520). For example, the transaction management platform (e.g., using computing resource 215, processor 320, memory 330, storage component 340, input component 350, output component 360, communication interface 370, and/or the like) may receive, based on the authorization, login credentials associated with the merchant account, as described above.

As further shown in FIG. 5, process 500 may include determining that transaction account information for the merchant account is to be updated (block 530). For example, the transaction management platform (e.g., using computing resource 215, processor 320, memory 330, storage component 340, input component 350, output component 360, communication interface 370, and/or the like) may determine that transaction account information for the merchant account is to be updated, as described above.

As further shown in FIG. 5, process 500 may include navigating, using a navigation model, a browser to a merchant portal associated with the merchant (block 540). For example, the transaction management platform (e.g., using computing resource 215, processor 320, memory 330, storage component 340, input component 350, output component 360, communication interface 370, and/or the like) may navigate, using a navigation model, a browser to a merchant portal associated with the merchant, as described above.

As further shown in FIG. 5, process 500 may include performing, using the navigation model and the login credentials, a login operation to log in to the merchant portal, wherein the navigation model performs the login operation by accessing the login credentials from a credential mapping stored in a data structure of the device (block 550). For example, the transaction management platform (e.g., using computing resource 215, processor 320, memory 330, storage component 340, input component 350, output component 360, communication interface 370, and/or the like) may perform, using the navigation model and the login credentials, a login operation to log in to the merchant portal, as described above. In some implementations, the navigation model may perform the login operation by accessing the login credentials from a credential mapping stored in a data structure of the device.

As further shown in FIG. 5, process 500 may include navigating, using the navigation model, the merchant portal, via the browser, to access the transaction setting of the merchant account (block 560). For example, the transaction management platform (e.g., using computing resource 215, processor 320, memory 330, storage component 340, input component 350, output component 360, communication interface 370, and/or the like) may navigate, using the navigation model, the merchant portal, via the browser, to access the transaction setting of the merchant account, as described above.

As further shown in FIG. 5, process 500 may include updating, using the navigation model, the transaction setting to include the transaction account information to permit a transaction associated with the user and the merchant to utilize the transaction account information (block 570). For example, the transaction management platform (e.g., using computing resource 215, processor 320, memory 330, storage component 340, input component 350, output component 360, communication interface 370, and/or the like) may update, using the navigation model, the transaction setting to include the transaction account information to permit a transaction associated with the user and the merchant to utilize the transaction account information, as described above.

Process 500 may include additional implementations, such as any single implementation or any combination of implementations described below and/or in connection with one or more other processes described elsewhere herein.

In a first implementation, the credential mapping may include a plurality of respective login credentials for a plurality of merchant accounts, and the navigation model may select the login credentials from the plurality of respective login credentials to perform the login operation based on the credential mapping identifying that the login credentials are associated with the merchant account.

In a second implementation, alone or in combination with the first implementation, the login credentials may be stored in the credential mapping based on receiving the authorization, wherein the authorization is verified based on a user verification process associated with the device.

In a third implementation, alone or in combination with one or more of the first and second implementations, the transaction account information may be generated based on determining that the transaction account information for the merchant account is to be updated, and the transaction account information may comprise a virtual transaction account identifier and a virtual transaction account expiration corresponding to the virtual transaction account identifier.

In a fourth implementation, alone or in combination with one or more of the first through third implementations, the navigation model may be configured to use a RPA that is configured based on the merchant portal.

In a fifth implementation, alone or in combination with one or more of the first through fourth implementations, the transaction setting may be updated based on at least one of: adding the transaction account information to the transaction setting, setting the transaction account information as default transaction account information for transactions associated with the merchant and the user, or replacing previous transaction account information with the transaction account information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 for management of credentials and authorizations for transactions. In some implementations, one or more process blocks of FIG. 6 may be performed by a transaction management platform (e.g., transaction management platform 210). In some implementations, one or more process blocks of FIG. 6 may be performed by another device or a group of devices separate from or including the transaction management platform, such as a user device (e.g., user device 230), a merchant platform (e.g., merchant platform 240), a transaction account platform (e.g., transaction account platform 250), and/or the like.

As shown in FIG. 6, process 600 may include determining that transaction account information associated with a transaction account is to be updated, wherein the transaction account is associated with a user (block 610). For example, the transaction management platform (e.g., using computing resource 215, processor 320, memory 330, storage component 340, input component 350, output component 360, communication interface 370, and/or the like) may determine that transaction account information associated with a transaction account is to be updated, as described above. In some implementations, the transaction account may be associated with a user.

As further shown in FIG. 6, process 600 may include identifying a merchant account that is configured to use the transaction account for a transaction associated with the user and a merchant (block 620). For example, the transaction management platform (e.g., using computing resource 215, processor 320, memory 330, storage component 340, input component 350, output component 360, communication interface 370, and/or the like) may identify a merchant account that is configured to use the transaction account for a transaction associated with the user and a merchant, as described above.

As further shown in FIG. 6, process 600 may include navigating, using a navigation model, a merchant portal to access the merchant account, wherein the merchant portal is associated with the merchant (block 630). For example, the transaction management platform (e.g., using computing resource 215, processor 320, memory 330, storage component 340, input component 350, output component 360, communication interface 370, and/or the like) may navigate, using a navigation model, a merchant portal to access the merchant account, as described above. In some implementations, the merchant portal may be associated with the merchant.

As further shown in FIG. 6, process 600 may include performing, using the navigation model and login credentials for the merchant account, a login operation to access the merchant account, via the merchant portal, wherein the login credentials are stored in a credential mapping that indicates an authorization to update the transaction account information to permit the transaction account information to be used in association with the merchant account (block 640). For example, the transaction management platform (e.g., using computing resource 215, processor 320, memory 330, storage component 340, input component 350, output component 360, communication interface 370, and/or the like) may perform, using the navigation model and login credentials for the merchant account, a login operation to access the merchant account, via the merchant portal, as described above. In some implementations, the login credentials may be stored in a credential mapping that indicates an authorization to update the transaction account information to permit the transaction account information to be used in association with the merchant account.

As further shown in FIG. 6, process 600 may include updating, using the navigation model, a transaction setting of the merchant account to include updated transaction account information for the transaction account (block 650). For example, the transaction management platform (e.g., using computing resource 215, processor 320, memory 330, storage component 340, input component 350, output component 360, communication interface 370, and/or the like) may update, using the navigation model, a transaction setting of the merchant account to include updated transaction account information for the transaction account, as described above.

Process 600 may include additional implementations, such as any single implementation or any combination of implementations described below and/or in connection with one or more other processes described elsewhere herein.

In a first implementation, the merchant account may be identified based on the user accessing the merchant portal.

In a second implementation, alone or in combination with the first implementation, the merchant portal may comprise at least one of: a web-based portal that is accessible via a browser, or an application portal that is accessible via an application of a user device.

In a third implementation, alone or in combination with one or more of the first and second implementations, the navigation model may comprise a RPA that is configured to access the merchant account via a user interface of the merchant portal.

In a fourth implementation, alone or in combination with one or more of the first through third implementations, the transaction setting may be capable of being updated without interrupting a user session associated with the merchant portal.

In a fifth implementation, alone or in combination with one or more of the first through fourth implementations, the transaction setting may be updated based on at least one of: adding the updated transaction account information to the transaction setting, setting the updated transaction account information as default transaction account information for transactions associated with the merchant and the user, or replacing previous transaction account information with the updated transaction account information.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 for management of credentials and authorizations for transactions. In some implementations, one or more process blocks of FIG. 7 may be performed by a transaction management platform (e.g., transaction management platform 210). In some implementations, one or more process blocks of FIG. 7 may be performed by another device or a group of devices separate from or including the transaction management platform, such as a user device (e.g., user device 230), a merchant platform (e.g., merchant platform 240), a transaction account platform (e.g., transaction account platform 250), and/or the like.

As shown in FIG. 7, process 700 may include detecting that a user is accessing a merchant account via a first user session associated with a merchant portal, wherein the merchant account and the merchant portal are associated with a merchant (block 710). For example, the transaction management platform (e.g., using computing resource 215, processor 320, memory 330, storage component 340, input component 350, output component 360, communication interface 370, and/or the like) may detect that a user is accessing a merchant account via a first user session associated with a merchant portal, as described above. In some implementations, the merchant account and the merchant portal may be associated with a merchant.

As further shown in FIG. 7, process 700 may include receiving login credentials associated with the merchant account of the user to permit transaction account information to be used for a transaction associated with a transaction account of the user and the merchant (block 720). For example, the transaction management platform (e.g., using computing resource 215, processor 320, memory 330, storage component 340, input component 350, output component 360, communication interface 370, and/or the like) may receive login credentials associated with the merchant account of the user to permit transaction account information to be used for a transaction associated with a transaction account of the user and the merchant, as described above.

As further shown in FIG. 7, process 700 may include launching, while the user browses the merchant portal via the first user session, a second user session associated with the merchant portal (block 730). For example, the transaction management platform (e.g., using computing resource 215, processor 320, memory 330, storage component 340, input component 350, output component 360, communication interface 370, and/or the like) may launch, while the user browses the merchant portal via the first user session, a second user session associated with the merchant portal, as described above.

As further shown in FIG. 7, process 700 may include navigating, using a navigation model, the merchant portal via the second user session to access a transaction setting for the merchant account (block 740). For example, the transaction management platform (e.g., using computing resource 215, processor 320, memory 330, storage component 340, input component 350, output component 360, communication interface 370, and/or the like) may navigate, using a navigation model, the merchant portal via the second user session to access a transaction setting for the merchant account, as described above.

As further shown in FIG. 7, process 700 may include updating, using the navigation model, the transaction setting to include the transaction account information to permit the user to engage in the transaction using the transaction account (block 750). For example, the transaction management platform (e.g., using computing resource 215, processor 320, memory 330, storage component 340, input component 350, output component 360, communication interface 370, and/or the like) may update, using the navigation model, the transaction setting to include the transaction account information to permit the user to engage in the transaction using the transaction account, as described above.

Process 700 may include additional implementations, such as any single implementation or any combination of implementations described below and/or in connection with one or more other processes described elsewhere herein.

In a first implementation, the transaction management platform may determine that the user is no longer accessing the merchant portal via the first user session, and may remove, via the navigation model and based on determining that the user is no longer accessing the merchant portal via the first user session, the transaction account information from the transaction setting.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

detecting, by a first device, a first session between a second device and a portal;

monitoring, by the first device, to detect a change associated with an account related to the second device;

establishing, by the first device, while the first session is being used and without interrupting the first session, a second session associated with the portal, wherein the second session is different from the first session;

navigating, by the first device, an interface associated with the portal via a navigation model, wherein the navigation model is configured to navigate, via the second session and while the first session is ongoing, the interface and to identify elements of the portal that correspond to updating information related to the detected change;

generating, by the first device and based on navigating the interface, virtual account information associated with a transaction related to the portal;

accessing, by the first device and based on the navigation model, the portal to access the account;

updating, by the first device, based on navigating the interface, and based on the identified elements, a setting associated with the account to include the virtual account information; and removing in response to determining that the portal is no longer being accessed via the first session, the virtual account information from the setting associated with the account.

2. The method of claim 1, further comprising:

obtaining authorization to manage transaction information for a merchant associated with the portal.

3. The method of claim 1, wherein navigating the portal comprises:

obtaining credential information from a credential mapping stored on the first device.

4. The method of claim 1, wherein the change associated with the account is related to the transaction, and wherein the transaction is further associated with the second device.

5. The method of claim 1, wherein navigating the interface comprises identifying interface components associated with the portal that correspond to updating the setting.

6. The method of claim 1, wherein the virtual account information expires within a shorter time period compared to a physical account information.

7. The method of claim 1, wherein the second session is associated with a new window session.

8. A first device, comprising:

one or more memories; and one or more processors, coupled to the one or more memories, configured to:

detect a first session between a second device and a portal;

monitor to detect a change associated with an account related to the second device;

establish, while the first session is being used and without interrupting the first session, a second session associated with the portal, wherein the second session is different from the first session;

navigate an interface associated with the portal via a navigation model, wherein the navigation model is configured to navigate, via the second session and while the first session is ongoing, the interface and to identify elements of the portal that correspond to updating information related to the detected change;

generate, based on navigating the interface, virtual account information associated with a transaction related to the portal;

update, based on navigating the interface and based on the identified elements, a setting associated with the account to include the virtual account information; and remove in response to determining that the portal is no longer being accessed via the first session, the virtual account information from the setting associated with the account.

9. The first device of claim 8, wherein the one or more processors are further configured to:

obtain authorization to manage transaction information for a merchant associated with the portal.

10. The first device of claim 8, wherein the navigation model is based on a robotic process automation (RPA).

11. The first device of claim 8, wherein the one or more processors, to navigate the portal, are configured to:

obtain credential information from a credential mapping stored on the first device.

12. The first device of claim 8, wherein the change associated with the account is related to the transaction, and wherein the transaction is further associated with the second device.

13. The first device of claim 8, wherein the one or more processors, to navigate the interface, are configured to identify interface components associated with the portal that correspond to updating the setting.

14. The first device of claim 8, wherein the virtual account information expires within a shorter time period compared to a physical account information.

15. A non-transitory computer-readable medium storing a set of instructions, the set of instructions comprising:

one or more instructions that, when executed by one or more processors of a first device, cause the first device to:

detect a first session between a second device and a portal;

monitor to detect a change associated with an account related to the second device;

establish, while the first session is being used and without interrupting the first session, a second session associated with the portal, wherein the second session is different from the first session;

navigate an interface associated with the portal via a navigation model, wherein the navigation model is configured to navigate, via the second session and while the first session is ongoing, the interface and to identify elements of the portal that correspond to updating information related to the detected change;

generate, based on navigating the interface, virtual account information associated with a transaction related to the portal;

update, based on navigating the interface and based on the identified elements, a setting associated with the account to include the virtual account information; and remove in response to determining that the portal is no longer being accessed via the first session, the virtual account information from the setting associated with the account.

16. The non-transitory computer-readable medium of claim 15, wherein the one or more instructions further cause the first device to:

obtain authorization to manage transaction information for a merchant associated with the portal.

17. The non-transitory computer-readable medium of claim 15, wherein the navigation model is based on a robotic process automation (RPA).

18. The non-transitory computer-readable medium of claim 15, wherein the one or more instructions, that cause the first device to navigate the portal, cause the first device to:

obtain credential information from a credential mapping stored on the first device.

19. The non-transitory computer-readable medium of claim 15, wherein the change associated with the account is related to the transaction, and wherein the transaction is further associated with the second device.

20. The non-transitory computer-readable medium of claim 15, wherein the virtual account information expires within a shorter time period compared to a physical account information.

* * * * *